Patented June 15, 1926.

1,589,103

UNITED STATES PATENT OFFICE.

HERBERT BUFFINGTON, OF SEATTLE, WASHINGTON, ASSIGNOR, BY MESNE ASSIGNMENTS, TO BUFFINGTON WATERPROOF PAPER CORPORATION, OF SEATTLE, WASHINGTON, A CORPORATION OF WASHINGTON.

WATERPROOFING COMPOUND AND PAPER WATERPROOFED THEREBY.

No Drawing.  Application filed March 18, 1925. Serial No. 16,580.

My invention relates to compounds which are employed for waterproofing such materials as paper.

The object of my invention is to improve upon compounds previously used for like purposes, and particularly to produce a compound which may be used to produce a high quality waterproof paper suitable for books, and particularly memorandum and record books which will at times be subjected to the rain or other dampening influences.

My invention comprises a compound having the ingredients proportioned and combined in the manner to be hereinafter defined, the same being employed as stated to waterproof paper. The preferred ingredients together with their relative proportions and the manner of compounding and applying them are as hereinafter set forth, it being understood that a reasonable departure from the exact proportions named may be employed.

The materials employed by me and their preferred proportions are as follows:

|  | Per cent. |
|---|---|
| Zinc oxide | 37½ |
| Starch | 5 |
| Boiled linseed oil | 5 |
| A volatile organic solvent | 12½ |
| White dammar varnish | 39 |
| A scenting or deodorizing oil | 1 |

As an example of the solvent to be employed the product which is known to the trade as "Oronite light solvent" may be named. This is a hydrocarbon derivative of petroleum having a low boiling point ranging in properties between a high flash gasoline and petroleum ether. It is frequently employed in the manufacture of paints and as a solvent and cleaner.

The volatile characteristics of the solvent used should be such that it will entirely evaporate from the finished product. Solvents not of petroleum origin, such as alcohols, ethers and analogous volatile products from coal distillation may be employed.

This is prepared and combined as follows:

The zinc oxide, linseed oil and dammar varnish are mixed and well ground together. The starch is incorporated with the solvent. The two compounds thus formed are thoroughly mixed together and the scenting or deodorizing oil added last.

Zinc oxide is employed largely as a filler and as a color determining agent. Its use without other coloring pigment produces a white product. If a colored product is wanted a colored pigment or pigments are employed, either supplemental to or in part replacement of the zinc oxide.

Dammar varnish is preferred to other analogous resins because of its superior qualities as compared with more common grades of resins.

Wheat flour or certain other sources of starch may be substituted in whole or in part for the starch above named. Wheat flour does not produce as fine a product as starch, the paper waterproofed thereby having a slight cloudiness of color. When wheat flour is substituted for starch, the amount should be approximately double that of the starch displaced.

As the scenting product, I prefer oil of bergamot, although other products may be substituted therefor. This may be omitted or varied in amount as circumstances or requirements vary.

After the complete compound has been assembled it is applied to the paper by immersing the paper therein until it has become well impregnated therewith. It is then dried, whereupon it is ready for use.

A variation in the proportions is required to best adapt the waterproofing material to different qualities of paper and especially as regards the proportion of volatile organic solvent used. When the paper is very absorbent an increased proportion of the volatile solvent may and should be used. This may be increased to as much as three parts of solvent to one of zinc oxide for a very absorbent paper while for a non-absorbent sheet little or no increase is necessary.

A paper prepared by the application of the above compound becomes highly resistant to the action of water, retains its normal color and surface appearance and will readily take figures and writing whether made with a pencil or ink. It is therefore highly desirable for engineers' and contractors' field notes, tally sheets and books, and all purposes where moisture would affect ordinary or untreated paper.

Paper so treated is also excellently adapted for making containers in which waterproof quality is desirable. Containers made of such paper may be employed for holding liquids for considerable time.

What I claim as my invention is:

1. A waterproofing compound for paper and like fabrics composed of the following ingredients in substantially the proportions given:

| | Per cent. |
|---|---|
| Zinc oxide | 37½ |
| Boiled linseed oil | 5 |
| White dammar varnish | 39 |
| Starch | 5 |
| Volatile organic solvent | 12½ |
| Scenting oil | 1 |

2. A paper water-proofed by treatment in a bath containing zinc oxide, 37½%; boiled linseed oil, 5%; white dammar varnish, 39%; starch, 5%; a volatile organic solvent, 12½%.

Signed at Seattle, King County, Washington, this 12th day of March, 1925.

HERBERT BUFFINGTON.